April 16, 1968  J. V. KNOWLES  3,378,314
ENDLESS BELT TREAD ASSEMBLY
Filed May 27, 1966  2 Sheets-Sheet 1

INVENTOR
JACK V. KNOWLES

BY *Miller, Morris & Pappas*

ATTORNEYS

April 16, 1968  J. V. KNOWLES  3,378,314
ENDLESS BELT TREAD ASSEMBLY
Filed May 27, 1966  2 Sheets-Sheet 2
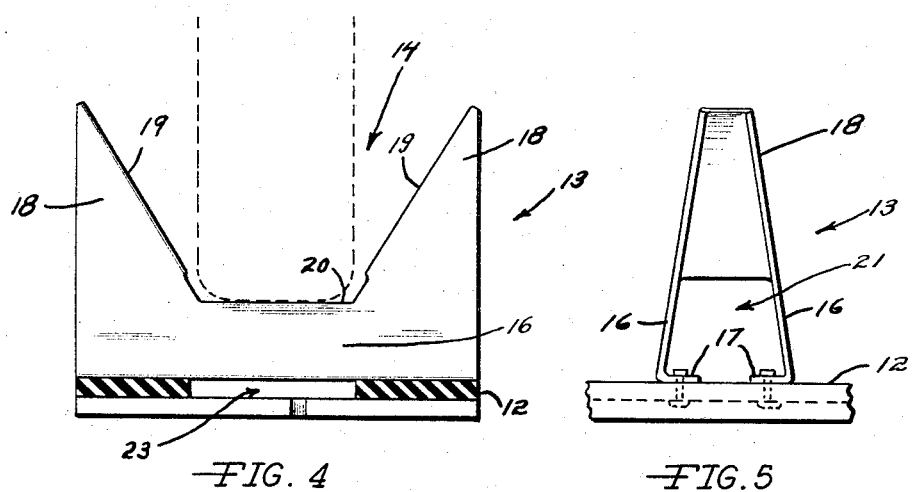
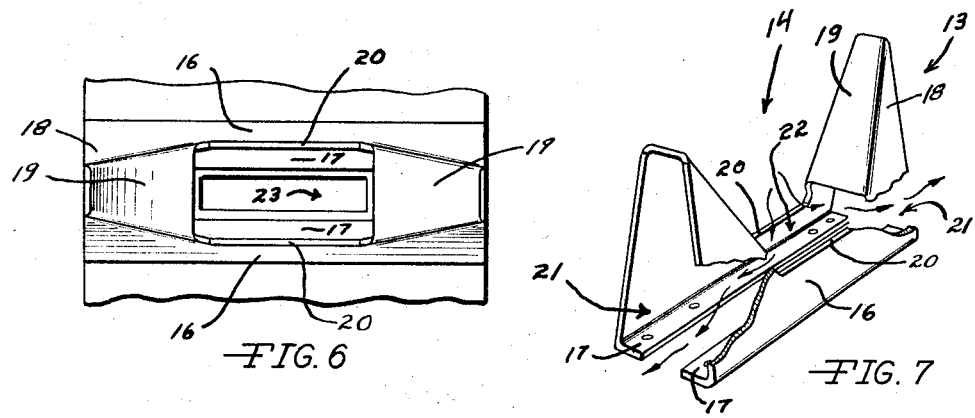
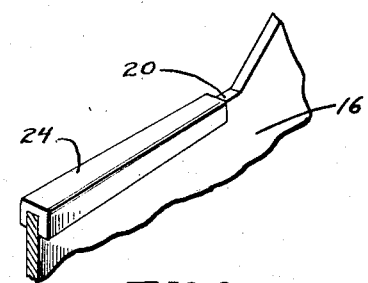
INVENTOR
JACK V. KNOWLES
BY Miller, Morris & Pappas
ATTORNEYS

United States Patent Office 3,378,314
Patented Apr. 16, 1968

3,378,314
ENDLESS BELT TREAD ASSEMBLY
Jack V. Knowles, East Lansing, Mich., assignor to Globe Trotter Corporation, East Lansing, Mich., a corporation of Michigan
Filed May 27, 1966, Ser. No. 553,419
10 Claims. (Cl. 305—13)

ABSTRACT OF THE DISCLOSURE

An endless belt tread assembly consisting of a flexible endless belt provided with a plurality of elongate hollow wheel cleats transversely positioned on the inner surface thereof. The wheel cleats are open at each end towards and proximate to the sides of the flexible belt. Each of the wheel cleats is further configured to define a central depressed wheel engaging trough portion therein which is in open communication with the open ends of the wheel cleat through a connecting passage defined by the hollow wheel cleat.

---

This invention relates to an endless belt tread assembly for use with automotive vehicles and more particularly to a flexible endless belt provided with a plurality of self-cleaning wheel cleats provided on the inner surface of the endless belt. Further, this invention relates to an endless belt assembly having a plurality of wheel cleat structures which enable the vehicle to go through deep mud, clay or snow, and which are configured to avoid slippage or spinning of the drive wheels in engagement therewith.

Heretofore, endless belt assemblies which have been provided for use on automotive vehicles equipped with pneumatic tires have been found to quickly become ineffective and inoperative when used in deep slushy snow, mud or clay. This ineffectiveness or inoperativeness has occurred because the snow, mud or clay has become trapped and packed on the inside of the endless belt and particularly in and around the wheel cleats or wheel brackets upon which the pneumatic tires ride. Such packing has neutralized the gripping function of the drive tire and spinning has occurred so as to eliminate the traction necessary to drive the endless belt assembly and, hence, propel the vehicle.

A further problem that has been encountered when the endless belt assemblies of the prior art have been mounted upon four wheel drive automotive vehicles is that binding occurs causing the vehicle to stall. The wheel cleats of the present invention are designed to cooperate in such a way as to allow traction from the rear tires only, thereby allowing free slippage to occur at the forward tires, and thus avoiding binding which occurs when the endless belt assembly "fights" the mechanical drive of the vehicle.

A further problem has been encountered in the endless belt assemblies of the prior art due to the fact that the wheel engaging cleat members provided on the inside surface of the endless belt are spaced apart from each other and do not interact with each other as they pass around the wheels of the vehicle. In this relatively isolated positioning, each wheel cleat becomes caked with ice, mud or snow, thereby causing slippage to occur when the flexible belt assembly passes over the drive wheels.

It is therefore an object of this invention to provide an endless belt assembly having self-cleaning wheel cleat structures which eliminate clogging of the cleat and belt assembly by snow, mud or clay.

Another object of this invention is to provide an endless belt assembly having a plurality of self-cleaning wheel cleats provided on the inside surface thereof so that the external sidewalls of the wheel cleat structures move into spaced-apart closer proximity with each other as they pass around the wheels of the automotive vehicle upon which the endless belt assembly is mounted.

A still further object of this invention is to provide an endless belt assembly which can be used on four wheel drive vehicles and which eliminates binding of the endless belt assembly due to interfering action with the mechanical drive system of the vehicle.

Another object of this invention has been to provide an endless belt assembly provided with a plurality of wheel cleat structures having sloped side wall surfaces which move into close proximity with the sloped surface of the next adjacent wheel cleat structure so as to crunch or crush any foreign matter therebetween as they pass around the automotive wheels and subsequently spread apart as they leave the wheel area thereby dropping out the crushed ice or other foreign matter positioned therebetween.

Yet another object of this invention is to provide a self-cleaning open end wheel cleat structure having a depressed center portion provided with an opening therein which is in open communication with the open ends of the wheel cleat structure so that, as the automotive vehicle wheel passes thereover, snow, mud or other foreign particles trapped between the wheel and the wheel cleat structure are forced downwardly through the aforementioned opening and out the open ends of the wheel cleat structure so as to avoid any clogging in use.

A still further object of this invention is to provide a wheel cleat structure which defines a wheel engaging depression over which the wheel of the automotive vehicle passes and which is provided with spaced apart side wall portions whose parallel spaced apart upper edges are the only points which come into contact with the bottom of the automotive vehicle tire passing thereover.

Another object of this invention is to provide a flexible endless belt assembly provided with a plurality of wheel cleat structures on the inside surface thereof which are configured so as to permit flexure of the endless belt surface thereunder as the automotive wheel passes over the wheel cleat structures and presses downwardly against caked ice or mud trapped within the wheel cleat structure, thereby causing the flexible belt surface to flex so as to break up and remove the caked clay, mud or snow.

Yet another object of this invention is to provide a flexible endless belt assembly provided with a plurality of wheel cleat structures, said endless belt defining a plurality of openings therethrough which communicate with the interior portions of the wheel cleat structures so as to permit escape of snow and ice therefrom under the pressure of wheels passing over the cleat members.

Other objects and advantages found in the construction of my invention will be apparent from a consideration of the following specification in connection with the appended claims and the accompanying drawings.

In the drawings:
FIGURE 1 is a side elevation view of the invention showing the endless belt tread assembly with the self-cleaning wheel cleats in place upon the wheels of a vehicle.

FIGURE 4 is an enlarged schematic view of the wheel cleat structure in position upon the inner surface of the endless belt and showing in phantom line, the automotive wheel passing over the centrally positioned horizontal upper edges of the wheel cleat.

FIGURE 5 is a schematic view showing a wheel cleat in position upon the endless belt tread member.

FIGURE 6 is a top view of a wheel cleat and showing the opening provided through the endless belt and located intermediate the base support portions of the wheel cleat.

FIGURE 7 is a breakaway perspective view of the wheel cleat member illustrating the open end construction of the wheel cleat and the opening in the depressed central portion in communication therewith.

FIGURE 8 is a perspective view of a channel insert member adapted for insertion over the horizontal upper edges of the sidewalls so as to provide a wider wheel engaging surface as needed.

General description

In general, an endless belt tread assembly 11 having uniquely formed self-cleaning wheel cleats provided on the inside surface thereof is provided for use on automotive vehicles of all types which are well known in the art. Such vehicles may be provided with adjustable front or rear wheel assemblies which can be moved so as to facilitate the mounting of the endless belt assembly on the wheels of the vehicle. In addition, the endless belt tread assemblies can be installed over the wheels of a standard vehicle, such as a jeep. The use of this endless belt assembly converts the vehicle into a tractor-like unit which can be used to move over heavy snow, deep mud, or clay which is otherwise impassable.

As will be described hereafter, the wheel cleats 13 which are provided on the inside surface of the endless belt tread member 12 and which come into contact with the wheels of the automotive vehicle, are open at each end and thus are uniquely designed so as to be self-cleaning.

In addition, the unique wheel cleats 13 are designed so as to provide two parallel spaced-apart edge surfaces which come into contact with the automotive wheel so as to avoid the use of a unitary flat bearing surface which would promote slippage or wheel spinning under heavy snow, ice or mud conditions.

In addition, each of the individual wheel cleats are provided with side surfaces which slope inwardly. The use of sloping side walls enable the wheel cleats to coact with each other as they pass around the wheel of the automotive vehicle by moving into closer proximity with each other, not only providing more closely spaced side wall upper edge bearing surfaces so as to enhance the traction drive capabilities of the unit, but also so as to crush any foreign objects, such as ice and snow accumulations, therebetween and, thus, to further enhance the self-cleaning qualities of the entire endless belt tread assembly.

As will be further described in detail, transversely oriented spaced-apart openings are provided through the endless belt member so that each of the openings are positioned intermediate the base support walls of each wheel cleat. As the wheel of the vehicle passes over the wheel cleat, snow, ice or mud is forced downwardly through the opening defined in the depressed central portion of the cleat and is forced out through the opening in the endless belt and/or outwardly through the open-ends of the wheel cleat, thus providing the unique self-cleaning action described herein.

It is thus seen that a unique endless belt tread assembly is provided with a plurality of uniquely configured wheel cleats which are self-cleaning and which coact with each other to provide an endless belt tread assembly having positive traction and which can be used on four wheel drive units without binding.

Specific description

Figure 1:
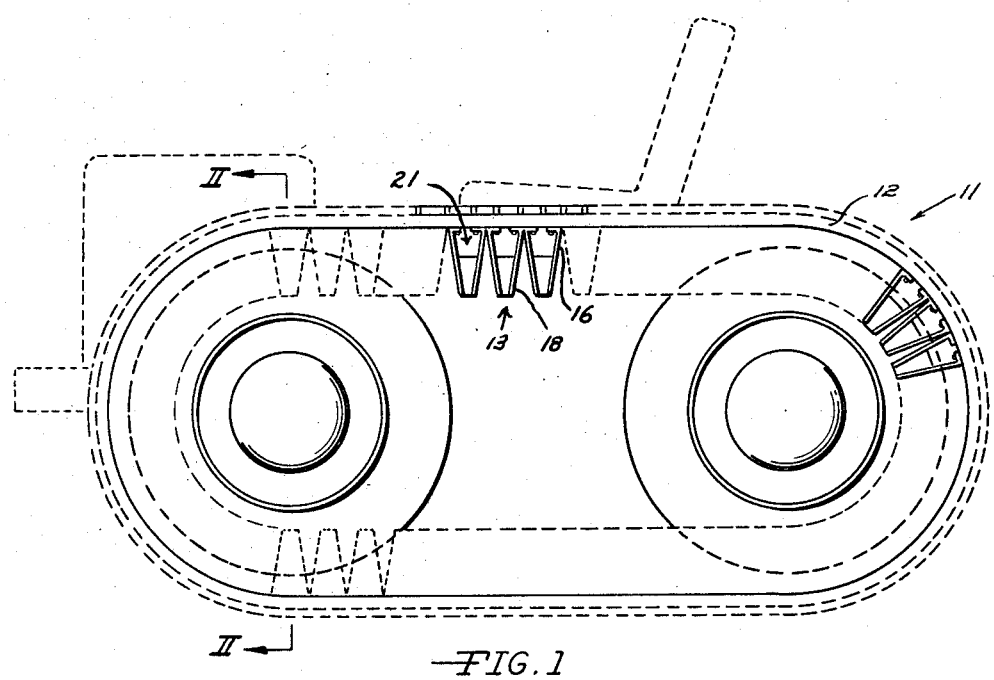
Figure 2:
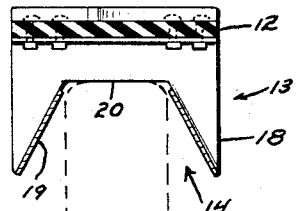
FIGURE 2 is a section view taken on line II—II of FIGURE 1 showing the wheel of the vehicle in phantom line and the endless belt tread assembly in position therearound.

As shown in FIGURE 1, an endless belt tread assembly 11 consists of an endless belt member 12 having a plurality of wheel cleats 13 provided upon the inside surface thereof.

The wheel cleat 13 is provided with buttress-like end portions 18 which rise at each end of the wall cleat 13 so as to form a wheel receiving depression 14 therebetween. The buttress-like portions 18 are provided with sloped inwardly facing wall surfaces 19 which slope downwardly and inwardly to complete the wheel receiving depression 14. The base of the wheel receiving depression 14 is defined by the parallel spaced apart horizontal upper edges 20 of the central depressed portion of the inwardly sloping side walls 16 of the wheel cleat 13.

The wheel cleat is provided with parallel spaced apart base portions 17 through which bolts or rivets are passed to engage the endless belt tread member 11 so as to position the wheel cleats thereon.

The wheel cleats 13 are transversly positioned along the entire inner surface of the endless belt 12 in a side-by-side relationship to each other. Thus, as shown generally in the drawings, the plurality of wheel cleat members 13 cooperate to form a wheel guide track which is formed by the depression 14 of each cleat 13. The depressed portion 14 is defined by the edges 20 of each wheel cleat member 13 and the sloped surfaces 19 provided on the buttress-like portion 18 of each wheel cleat member 13. The wheel guide track thus defined is spaced apart from and above the inside surface of the endless belt 12.

The wheel cleat members 13 have open end portions 21 as shown generally in the drawings and particularly in FIGURES 5 and 7.

The upper edges 20 of the central portion of wheel cleat member 13 also define an opening 22 therebetween which is in open communication with the open end portions 21 of the wheel cleat member 13. This open passage is shown schematically by the arrows in the breakaway view of the wheel cleat 13 shown in FIGURE 7.

Thus, as the endless belt assembly passes around the wheels upon which is is mounted, the outer peripheral surface of each wheel drives snow and mud which is trapped between it and the wheel cleat member 13 downwardly through the open space 22 defined by the wheel engaging edges 20. The snow and mud, thus compressed, is forced through the body of the wheel cleat member 13 and outwardly through the open end portions 21 thereof.

The self-cleaning qualities of the endless belt tread assembly can be further enhanced as desired by providing a plurality of openings 23 through the endless belt tread 12. Each of said openings 23 are positioned intermediate the spaced apart base support portions 17 of each respective wheel cleat 13. Thus, as snow, ice or mud is forced downwardly into the interior of the wheel cleat by a wheel passing thereover, the snow, ice or mud can be pushed out through the openings 23 in the endless belt as well as out through the open ends of the wheel cleats.

In this manner, a self-cleaning cleat is provided which does not become ineffective due to clogging by ice, mud or snow and which provides a positive gripping surface over which the wheels of the vehicle move.

Figure 3:
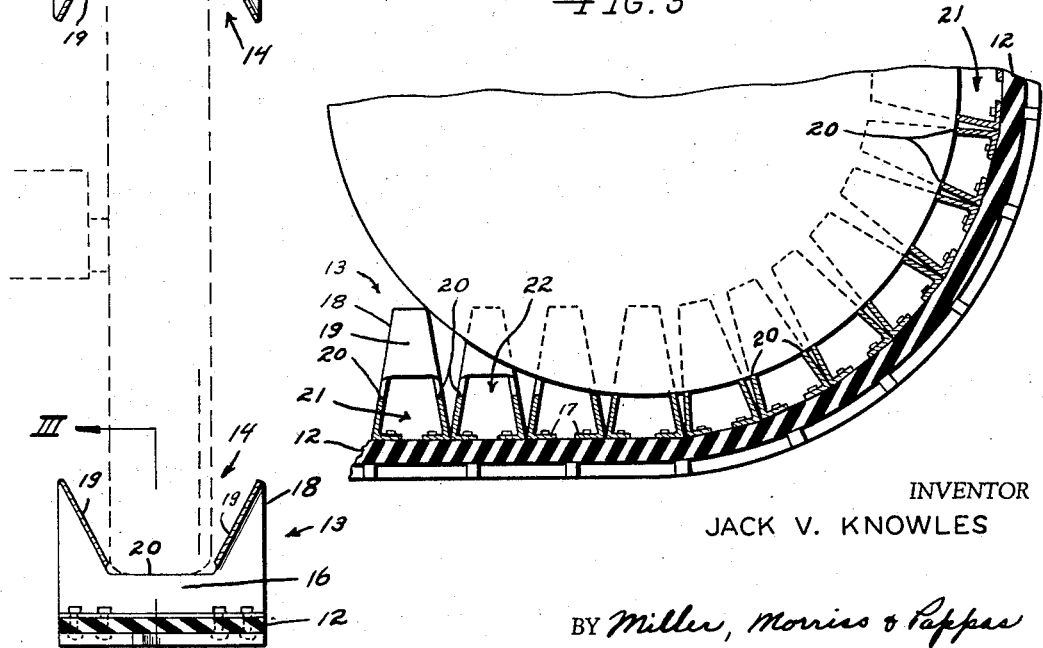
FIGURE 3 is an enlarged schematic view showing the wheel cleats both in and out of engagement with the automotive wheel and illustrating the manner in which the sloped side walls of the wheel cleats come into spaced-apart substantially abutting close proximity with each other as they pass around the wheel.

As shown in the partial schematic view of FIGURE 3, and generally throughout the drawings, the tires actually ride on and engage the horizontal spaced-apart upper edges 20 of the cleat member 13.

The concept of using spaced-apart edges 20 to engage the tires is opposite from the concept embodied in wheel cleat engaging devices of the prior art. The wheel cleat devices of the prior art provide a flat substantially wide surface upon which the wheel rides or moves over. The advantage of providing dual spaced-apart support or wheel engaging edges to engage the tires is that the narrow edges contribute to the breaking up or cutting through the snow, ice or mud covering the cleats. Further, such edges provide a more positive traction contact with the tire so as to further eliminate spinning or slipping of the drive wheels. Tests have shown that the edges 20, when properly proportioned in relation to the size of the vehicle, do not in any way damage or harm the tire, but merely provide a more positive traction to the entire endless belt assembly.

This is a totally unexpected result inasmuch as the general design approach in the devices of the prior art has been to provide cleats imparting a continuous wheel support engaging surface as opposed to the spaced apart edges 20 which are utilized in the present invention As shown in FIGURE 8, an elongate inverted U-channel member 24 can be crimped into position over the horizontal edges 20 so as to provide a replaceable wearing surface as needed. In addition, this would have the effect of providing a wider wheel engaging contact surface as needed for specific applications.

It is within the scope of the invention to have one of the wheel engaging edges 20 shorter in height than the other so as to achieve a better ice or snow breaking ability as the wheel of the vehicle passes thereover.

The critical factors to be found in this invention is to provide an endless belt assembly utilizing wheel cleat which is open at each end and which is provided with raised buttress-like side support members at each end thereof so as to define a depressed wheel receiving portion therein. The central depressed portion of the wheel cleat provides parallel horizontally oriented spaced apart tire support edges 20 which delineate the bottom of the depressed wheel engaging portion. The horizontal spaced apart edges 20 further define an opening over which the wheel passes while riding upon the upper edges 20 of the plurality of wheel cleats provided on the inner surface of the endless belt. The opening defined by the parallel spaced apart support edges 20 is in open communication with the open ends of the wheel engaging cleat. This permits the movement of snow, ice or mud downwardly through the wheel cleat and outwardly through the open ends thereof, thus enhancing the self-cleaning qualities of the cleat.

Another design factor which is important is that the parallel spaced apart base supports 17 provide a cleat whose central base portion is open to the inner surface of the flexible endless belt. In this manner, as the tire passes over the upper edges of the wheel cleat, any snow, ice or mud is forced downwardly through the upper opening into the interior of the wheel cleat. This compressive or crushing action causes the endless belt to flex, thereby enhancing the self-cleaning action of the cleat by providing a resilient force between the wheel and the flexing belt. This action tends to break up any ice, snow or mud formations greatly facilitating the self-cleaning action and allowing the foreign matter to pass out through the ends of the wheel cleat. This type of activity results in an endless belt assembly which does not clog or jam even under the most adverse ice, snow or mud conditions. Thus, as the tire passes over a cleat, the mud or snow or ice is forced downwardly, causing the rubber belt to flex in the exposed area between the base supports of the cleat. As the tire moves off of the cleat, the flexible belt surface flexes back into position causing the compacted ice, snow or mud to break away from the endless belt surface thus greatly facilitating the movement thereof outwardly through the end openings of the wheel cleat. This coacting flexure between tire and belt surface is particularly effective in freezing weather. Further, the provision of openings through the belt, as desired, intermediate the base support members 17 provide another "escape" route for compacted ice, snow or mud from within the interior of each wheel cleat.

Another important design factor is the fact that the side walls 16 of the cleats are sloped inwardly in such a manner that as they pass around the wheel, they come into closer proximity with the side walls of the adjacent cleats so as to provide more closely spaced wheel engaging edges 20 as shown in FIGURE 3. In addition, as the endless belt 11 moves around each wheel, each side wall of each cleat closes toward the next adjacent side wall of the next adjacent cleat so as to crush ice, snow or mud formations positioned therebetween. As the endless belt and cleats move away from the wheels, the side walls of each adjacent cleat move apart from each other as shown in the central portion of FIGURE 1 where the endless belt is in a straight rather than curved position. Any ice, snow or mud which has been compressed or crushed between the side walls while they were passing around the wheel is then released and falls away from the cleats. This action also contributes to the provision of an endless belt assembly which does not jam, even under heavy snow conditions.

Further, this unique endless belt tread assembly, when used on four wheel drive units, functions in such a manner so that it does not bind in use as do other types of belt or track assemblies. This bind is usually caused by the endless belt acting as a drive belt to fight the gears which drive the front wheels and thus cause the vehicle to stall. In either direction of travel, the present invention will allow enough slippage on the forward wheel, but none on the rear wheel thereby providing traction to pull from the rear wheel while there is slippage on the front wheel, thus eliminating any tendency to stall or jam the drive of the vehicle.

*Operation*

In operation, a pair of the endless belt assemblies 11 are mounted on each side of a vehicle so that each endless belt assembly extends around the front and rear wheel on each side of the vehicle. The endless belt assembly can be provided with connector elements (not shown) whereby the vehicle can be driven on the endless belt assembly in its open flat position. After the vehicle is in place upon the endless belt assembly, the free ends of the endless belt assembly can be joined together so that the endless belt assembly fits around the front and rear wheels on each side of the vehicle in question. In certain specially adapted vehicles, the endless belt assembly can be utilized in its unitary form inasmuch as the front or wheel assemblies of such specially adapted vehicles can be adjusted so as to permit the endless belt assembly to be placed over the wheels in their pulled back position. Once the endless belt assembly is in place on the wheels, the front wheels can then be extended forwardly to their regular use position so as to achieve the desired amount of tension of the endless belt assembly over the wheels in question. Once the endless wheel assembly is in place, the vehicle can be driven through deep snow, ice or mud as desired.

The conventional methods which are well known in the art for driving and steering tread vehicles such as tractors and tanks are also utilized in the instant vehicle and will not be described herein. The vehicles are adapted by standard hydraulic systems so that the vehicle can be steered or turned by braking the wheels on one side of the vehicle while driving the wheels on the other side thereof. The entire vehicle can thus be steered and driven in any desired direction and at any desired speed within the capabilities of the drive vehicle. The instant invention lies in the endless belt assembly which utilizes a plurality of the unique wheel cleats shown and described herein and not in the drive vehicle upon which the endless track assemblies can be mounted as desired.

It is within the scope of this invention to utilize any type of rubber or plastic flexible belt material to provide the endless belt element 12. As shown in the drawings, the outer surface of the endless belt element can be provided with any desired type of ground engaging cleats which are well known in the art. The instant invention is not concerned with the external ground engaging cleats, but is directed to an endless belt element having a plurality of closely spaced self-cleaning wheel engaging cleats thereon. In their use positions, the wheel cleats are attached to the belt by use of bolts or rivets which pass through the parallel spaced-apart base support portions 17 and the belt itself.

Various other modifications of the invention may be made without departing from the principle thereof. Each of the modifications is to be considered as included in the hereinafter appended claims, unless these claims by their language expressly provide otherwise.

Having thus set forth the nature of my invention, I claim the following:

1. In an endless belt assembly for use with self-propelled vehicles, the combination comprising:
   (a) a flexible endless belt member adapted for mounting around the wheels on one side of a vehicle; and
   (b) a plurality of self-cleaning wheel engaging hollow centrally open cleat structures transversely mounted on the inner surface of said belt, each of said cleat structures having integral raised spaced-apart side support end portions for engaging the sides of a tire, each of said wheel engaging cleat structures provided with open end portions which open outwardly toward the sides of said endless belt member.

2. In an endless belt assembly for use with self-propelled vehicles, the combination comprising:
   (a) a flexible endless belt member adapted for mounting around the wheels on one side of a vehicle; and
   (b) a plurality of self-cleaning hollow wheel cleat structures transversely mounted on the inner surface of said belt member, each of said wheel cleat structures provided with open-end portions which open outwardly toward the sides of said endless belt member, each of said wheel cleat structures having a wheel-engaging depressed central portion defining an opening therein opposite said belt member; and
   (c) a connecting passage defined by each of said hollow wheel cleat structures, said connecting passage connecting said opening to said open-end portions.

3. In an endless belt assembly provided with a plurality of transversely mounted wheel cleat structures on the inner surface thereof, each of said wheel cleat structures comprising:
   (a) an integrally formed hollow wheel cleat structure open at each end towards the sides of the endless belt assembly and having spaced-apart side wall portions which slope upwardly and inwardly toward each other, said side wall portions having upper spaced apart horizontally oriented edges;
   (b) raised spaced-apart side support members connecting said wall portions, said raised spaced-apart side support members cooperating with the upper spaced-apart horizontally oriented edges of said side wall portions to define a wheel-engaging trough having an opening therein; and
   (c) a connecting passage defined by said hollow wheel cleat structure, said connecting passage connecting said opening to said open ends of said wheel cleat structure.

4. In an endless belt assembly for use with self-propelled vehicles, the combination comprising:
   (a) a flexible endless belt adapted for mounting around the wheels on one side of a vehicle;
   (b) a plurality of self-cleaning hollow wheel cleat structures transversely mounted on the inner surface of said endless belt, each of said wheel cleat structures being open at each end, each of said wheel cleat structures provided with parallel spaced-apart inwardly and upwardly sloped side wall portions having upper spaced-apart horizontal edges;
   (c) raised spaced-apart side support members provided on said side wall portions of said wheel cleat structures so as to connect said side wall portions in said spaced relation, said raised spaced-apart side support members cooperating with the upper spaced-apart horizontal edges of said side-wall portions to define a wheel-engaging trough having an opening therein; and
   (c) a connecting passage defined by each of said hollow wheel cleat structures, said connecting passage connecting said opening to said open ends of said wheel cleat structures.

5. In the endless belt assembly of claim 4, wherein each of said wheel cleat structures are provided with side wall portions having a degree of slope such that the said side wall portions of the next adjacent wheel cleat structures move into substantially parallel spaced-apart relationship with each other as said wheel cleat structures move around the wheels upon which said endless belt member is mounted.

6. In an endless belt assembly for use with self-propelled vehicles, the combination comprising:
   (a) a flexible endless belt member adapted for mounting around the wheels on one side of a vehicle; and
   (b) a plurality of self-cleaning hollow wheel cleat structures having open-end portions which open toward the sides of said belt member transversely mounted on the inner surface of said member, each of said wheel cleat structures having a wheel-engaging depressed central portion defining an opening therein opposite said belt member, said opening being in open communication with said open-end portions through a connecting passage defined by said hollow wheel cleat structure.

7. In an endless belt assembly comprising an endless belt provided with a plurality of transversely mounted wheel cleat structures on the inner surface of said endless belt, each of said wheel cleat structures comprising:
   a self-cleaning hollow wheel cleat structure having open end portions which open toward the sides of the belt assembly, said wheel cleat structure having a wheel-engaging depressed central portion defining an opening therein, said opening being in open communication with said open-end portions through a connecting passage defined by said hollow wheel cleat structure.

8. In an endless belt assembly for use with self propelled vehicles, the combination comprising:
   (a) a flexible endless belt member adapted for mounting around the wheels on one side of a vehicle;
   (b) a plurality of elongate self-cleaning hollow wheel cleat structures having open-end portions which open toward the sides of said belt member, said wheel cleat structures provided with parallel spaced apart base portions connected to the inner surface of said endless belt member, the longitudinal axis of said cleat structures being transverse to the longitudinal axis of said endless belt member;
   (c) spaced-apart wheel cleat side wall portions provided on said wheel cleat structures, said side wall portions having horizontally oriented parallel spaced-apart upper edges;
   (d) raised spaced-apart side support members provided on each of said wheel cleat structures above said open-end portions so as to connect said side wall portions, said raised spaced-apart side support members cooperating with said parallel spaced-apart upper edges of said side wall portions to define a wheel-engaging trough having an opening at the bottom thereof; and
   (e) a connecting passage defined through each of said hollow wheel cleat structures, said passage connecting said opening to said open end portions.

9. In the endless belt assembly as claimed in claim 3 wherein said endless belt is provided with a plurality of openings therethrough, each of said openings respectively located between said base portions of each wheel cleat in spaced apart register with said opening at the bottom of said wheel-engaging trough, said connecting passage connecting both of said openings through each of said wheel cleats.

10. In the endless belt assembly of claim 8, wherein said side wall portions have a degree of slope such that the said side walls of next adjacent wheel cleat structures move into a substantially parallel spaced-apart position relative to each other as the wheel cleat structures move around the wheels upon which said endless belt member is mounted.

References Cited

UNITED STATES PATENTS

| | | | |
|---|---|---|---|
| 2,749,189 | 6/1956 | France | 305—56 X |
| 3,027,200 | 3/1962 | Patterson | 305—57 |
| 3,165,364 | 1/1965 | Hardman | 305—35 |
| 3,232,679 | 2/1966 | Katzenberger | 305—13 |

FOREIGN PATENTS 15,362 5/1929 Australia.

RICHARD J. JOHNSON, *Primary Examiner.*